(12) United States Patent
Wang et al.

(10) Patent No.: US 9,996,497 B2
(45) Date of Patent: Jun. 12, 2018

(54) METHOD AND DEVICE FOR PROCESSING GRAPHICS

(71) Applicant: VIA Alliance Semiconductor Co., Ltd., Shanghai (CN)

(72) Inventors: Yanjie Wang, Shanghai (CN); Chenyang Zhu, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 102 days.

(21) Appl. No.: 15/160,894

(22) Filed: May 20, 2016

(65) Prior Publication Data
US 2017/0154401 A1     Jun. 1, 2017

(30) Foreign Application Priority Data

Dec. 1, 2015   (CN) .......................... 2015 1 0868958

(51) Int. Cl.
*G09G 5/00*     (2006.01)
*G06F 13/42*    (2006.01)

(52) U.S. Cl.
CPC ................... *G06F 13/4282* (2013.01)

(58) Field of Classification Search
None
See application file for complete search history.

(56) References Cited

U.S. PATENT DOCUMENTS

| | | | |
|---|---|---|---|
| 8,547,480 B1* | 10/2013 | Brown | H04N 21/4307 348/500 |
| 2003/0084181 A1* | 5/2003 | Wilt | G09G 5/14 709/233 |
| 2005/0060421 A1* | 3/2005 | Musunuri | H04L 29/06027 709/231 |
| 2005/0123050 A1* | 6/2005 | Kondo | H04N 19/172 375/240.16 |
| 2010/0246395 A1* | 9/2010 | Itaya | H04N 21/23406 370/232 |
| 2011/0058440 A1* | 3/2011 | Smith | G11C 5/141 365/229 |
| 2011/0176542 A1* | 7/2011 | Biswas | H04L 12/413 370/389 |
| 2011/0211591 A1* | 9/2011 | Traub | H04L 47/34 370/474 |
| 2012/0151118 A1* | 6/2012 | Flynn | G06F 11/1008 711/6 |
| 2015/0206269 A1* | 7/2015 | Qin | G06F 17/2235 715/202 |
| 2016/0150130 A1* | 5/2016 | Noro | G06T 1/20 348/516 |
| 2016/0247484 A1* | 8/2016 | Chen | G09G 5/399 |

* cited by examiner

*Primary Examiner* — David H Chu
(74) *Attorney, Agent, or Firm* — McClure, Qualey & Rodack, LLP (57) ABSTRACT

A method for processing graphics is provided. The method includes: establishing streams corresponding to graphic layers drawn by at least one application; adding a one-shot signal to the end of the last stream of the streams; packaging the streams with the one-shot signal to form a packet; and transmitting the packet to a display interface unit (DIU).

10 Claims, 6 Drawing Sheets

METHOD AND DEVICE FOR PROCESSING GRAPHICS

CROSS REFERENCE TO RELATED APPLICATIONS

This application claims priority to Chinese Patent Application No. 201510868958.7 filed on Dec. 1, 2015 in the China Intellectual Property Office, the contents of which are incorporated by reference herein.

BACKGROUND OF THE INVENTION

Field of the Invention

Aspects of the present invention relate generally to a method and a device for processing graphics, and more particularly, to a method and a device for processing graphics using a one-shot signal.

Description of the Related Art

In a device such as a mobile phone that is equipped with an operating system such as Android, the display refresh process includes process of frame rendering, which comprises: each application (such as a desktop application or a flow-monitoring application) performs a rendering operation to render a respective graphic layer; after all applications finish the rendering operation, the system performs a combining operation to combine the respective graphic layers rendered by each application into a frame, and then the system transmits the frame to a display screen to be displayed. Therefore, duration of displaying a frame depends on the following factors: the maximum time it takes each application to perform a rendering operation, the time it takes each application to perform the combining operation, and the time it takes to output the fame to the display screen.

In order to improve the smoothness of displaying the frame, a vertical synchronization (VSYNC) refresh mechanism is introduced. In the VSYNC refresh mechanism, a periodic interrupt is generated by transmitting a VSYNC signal so that any rendering operation performed by each application or any combining operation performed by the system, is triggered via the VSYNC signal. Thus, the entire display refresh process can be performed in order.

However, when the performance of the hardware configuration of the device is lower, the time it takes to perform the rendering operation or the time it takes to perform the combining operation, may be longer than the period of the VSYNC signal, and this can result in frame skipping. It reduces the timeliness of refreshing the system display.

As shown above, a new method and a device for processing graphics is desirable.

BRIEF SUMMARY OF THE INVENTION

A detailed description is given in the following embodiments with reference to the accompanying drawings.

A method and a device for processing graphics are provided.

In a preferred embodiment, the invention is directed to a method for processing graphics, comprising: establishing streams corresponding to graphic layers drawn by at least one application; adding a one-shot signal to the end of the last stream of the streams; packaging the streams with the one-shot signal to form a packet; and transmitting the packet to a display interface unit (DIU).

In a preferred embodiment, the invention is directed to a device for processing graphics. The device comprises a control circuit, a processor and a memory. The processor is installed in the control circuit. The memory is installed in the control circuit and operatively coupled to the processor. The processor is configured to execute a program code stored in the memory to instruct a hardware composer to: establish streams corresponding to graphic layers drawn by at least one application; add a one-shot signal to the end of the last stream of the streams; package the streams with the one-shot signal to form a packet; and transmit the packet to a display interface unit (DIU).

In a preferred embodiment, the invention is directed to a method for processing graphics, comprising: receiving a packet; detecting whether the packet includes a one-shot signal; combining streams corresponding to graphic layers drawn by at least one application into a frame after detecting that the packet includes the one-shot signal; and transmitting the frame to a display device to display the frame.

In a preferred embodiment, the invention is directed to a device for processing graphics. The device comprises a control circuit, a processor and a memory. The processor is installed in the control circuit. The memory is installed in the control circuit and operatively coupled to the processor. The processor is configured to execute a program code stored in the memory to instruct a display interface unit (DIU) to: receive a packet; detect whether the packet includes a one-shot signal; combine streams corresponding to graphic layers drawn by at least one application into a frame after detecting that the packet includes the one-shot signal; and transmit the frame to a display device to display the frame.

In a preferred embodiment, the invention is directed to a method for processing graphics, comprising: establishing, by a hardware composer, streams corresponding to graphic layers drawn by at least one application; adding, by the hardware composer, a one-shot signal to the end of the last stream of the streams; packaging, by the hardware composer, the streams with the one-shot signal to form a packet; transmitting, by the hardware composer, the packet to a display interface unit (DIU); receiving, by the DIU, the packet; detecting, by the DIU, whether the packet includes the one-shot signal; combining, by the DIU, the streams into a frame after detecting that the packet includes the one-shot signal; and transmitting, by the DIU, the frame to a display device to display the frame.

In a preferred embodiment, the invention is directed to a device for processing graphics. The device comprises a control circuit, a processor and a memory. The processor is installed in the control circuit. The memory is installed in the control circuit and operatively coupled to the processor. The processor is configured to execute a program code stored in the memory to instruct a hardware composer and a display interface unit (DIU) to: establish, by a hardware composer, streams corresponding to graphic layers drawn by at least one application; add, by the hardware composer, a one-shot signal to the end of the last stream of the streams; package, by the hardware composer, the streams with the one-shot signal to form a packet; transmit, by the hardware composer, the packet to a display interface unit (DIU); receive, by the DIU, the packet; detect, by the DIU, whether the packet includes the one-shot signal; combine, by the DIU, the streams into a frame after detecting that the packet includes the one-shot signal; and transmit, by the DIU, the frame to a display device to display the frame.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Several exemplary embodiments of the present disclosure are described with reference to FIGS. 1 through 7, which generally relate to a method and a device for processing graphics. It should be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

Figure 1:
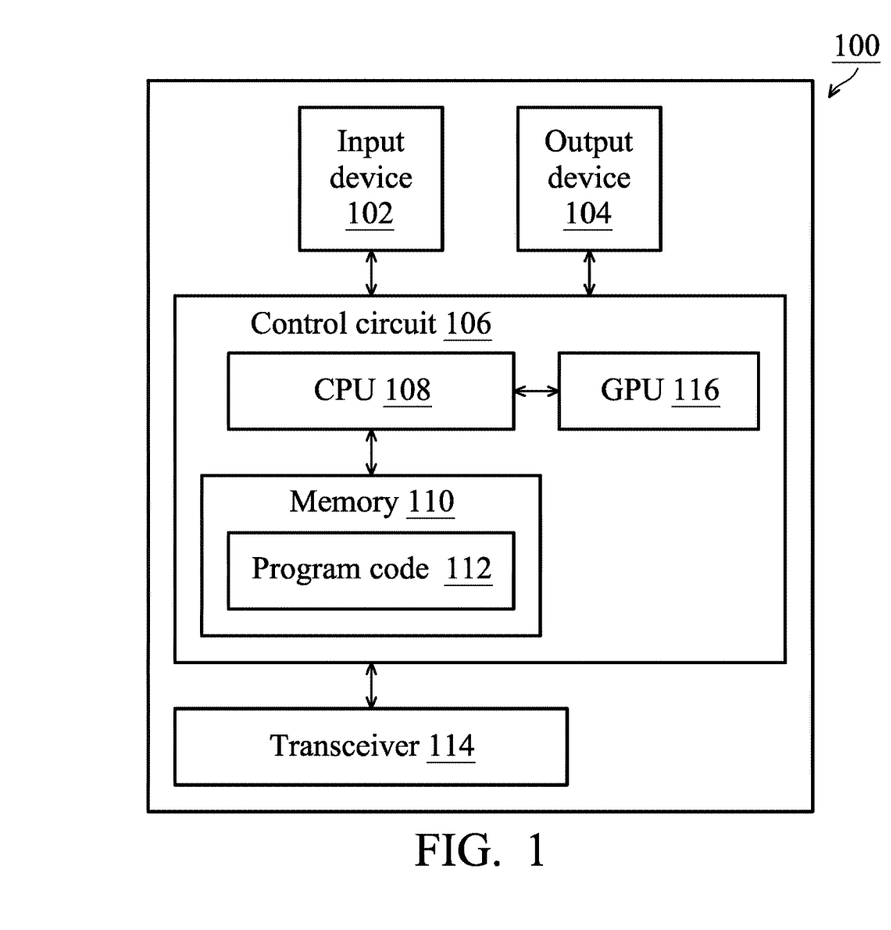
FIG. 1 shows an alternative simplified functional block diagram of a communications device according to one embodiment of the present invention.

FIG. 1 shows an alternative simplified functional block diagram of a communications device according to one embodiment of the present invention. In FIG. 1, the communication device 100 can be utilized for realizing a user equipment (UE) (or an access terminal (AT)). The communications device 100 may include an input device 102, an output device 104, a control circuit 106, a central processing unit (CPU) 108, a memory 110, a program code 112, a transceiver 114, and a graphic processing unit (GPU) 116. The control circuit 106 executes the program code 112 in the memory 110 through the CPU 108, thereby controlling the operation of the communications device 100. The communications device 100 can receive signals input by a user through the input device 102, such as a keyboard keypad, touch screen, or microphone (for voice input), and can output images and sounds through the output device 104, such as a screen or speakers. The transceiver 114 is used to receive and transmit wireless signals, deliver received signals to the control circuit 106 wirelessly, and output signals generated by the control circuit 106 wirelessly.

Figure 2:
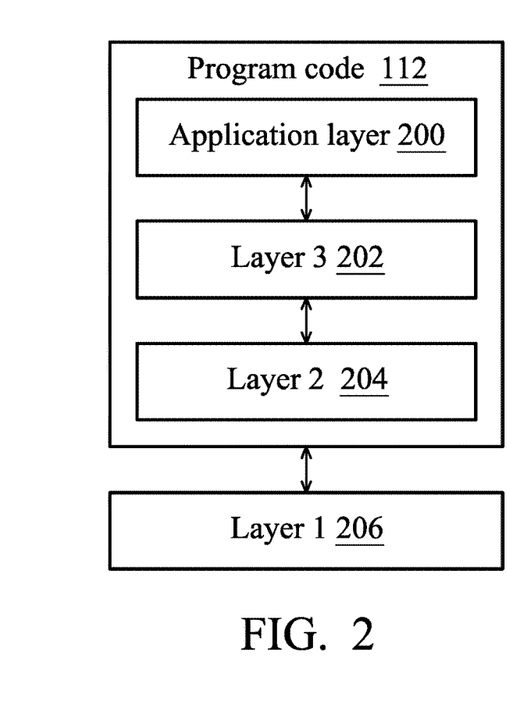
FIG. 2 is a simplified block diagram of the program code shown in FIG. 1 in accordance with one embodiment of the invention.

FIG. 2 is a simplified block diagram of the program code 112 shown in FIG. 1 in accordance with one embodiment of the invention. In this embodiment, the program code 112 includes an application layer 200, a Layer 3 202, and a Layer 2 204, and is coupled to a Layer 1 206. The Layer 3 202 generally performs radio resource control. The Layer 2 204 generally performs link control. The Layer 1 206 generally performs physical connections.

The communications device provided in the embodiments of the present invention can implement methods illustrated in the embodiments of the present invention. In order to easily describe, only the related parts of the present embodiment are shown. The specific technical details are illustrated in the embodiments shown in FIGS. 3, 5~7 of the present invention.

Figure 3:
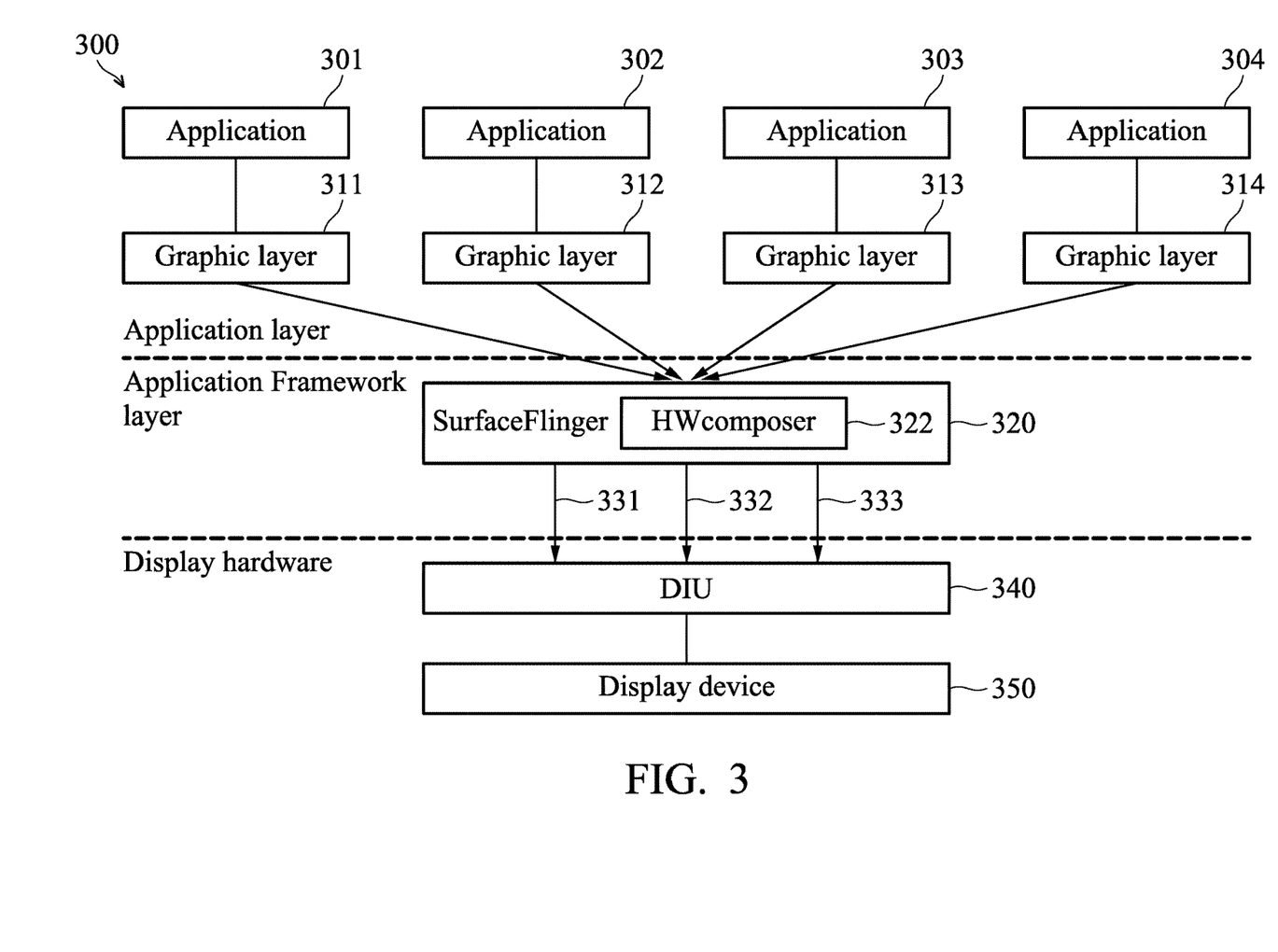
FIG. 3 is a schematic diagram of a principle framework outputting frames in an Android system according to one embodiment of the present invention.

FIG. 3 is a schematic diagram 300 of a principle framework outputting frames in an Android system according to one embodiment of the present invention. As shown in FIG. 3, in the example of the Android system, the process that a user triggers to render frames in the communications device, such as a mobile phone, through respective application programs (hereinafter, referred to as "application") and have the pictures displayed on the display screen comprises the following steps.

First, in the application layer, each application 301 to 304 performs a render operation according to its own application design. After the render operation is completed, each application transmits rendered graphic layers 311~314 to a SurfaceFlinger 320 which is responsible for refreshing the screen in an application framework layer.

Next, in the application framework layer, a hardware composer (HWcomposer) 322 binds the graphic layers 311~314 rendered by each application into a stream in such a way. Subsequently, the HWcomposer 322 queries a display interface unit (DIU) 340 for steams 331~333 that may be used, and transmits the streams to the DIU 340.

Finally, the DIU 340 synthesizes (combines) the streams into a frame, and transmits the frame to a display device 350 (which includes a display controller and a display screen). For example, but not a limiting one, an LCD hardware (including an LCD controller and an LCD display screen) is used to display the final frame.

It should be noted that the pictures which are input to the DIU 340 are called "streams". The DIU 340 may combine the streams into a frame, and transmit the frame to the display device 350 to display the frame.

Specifically, the steps of the image processing performed by the HWcomposer 322 and the DIU 340 are that the central processing unit (CPU) of the communications device uses an algorithm to achieve synthesis strategies, and then drives a graphic processing unit (GPU) of the communications device to implement synthesis operations.

Figure 4A:
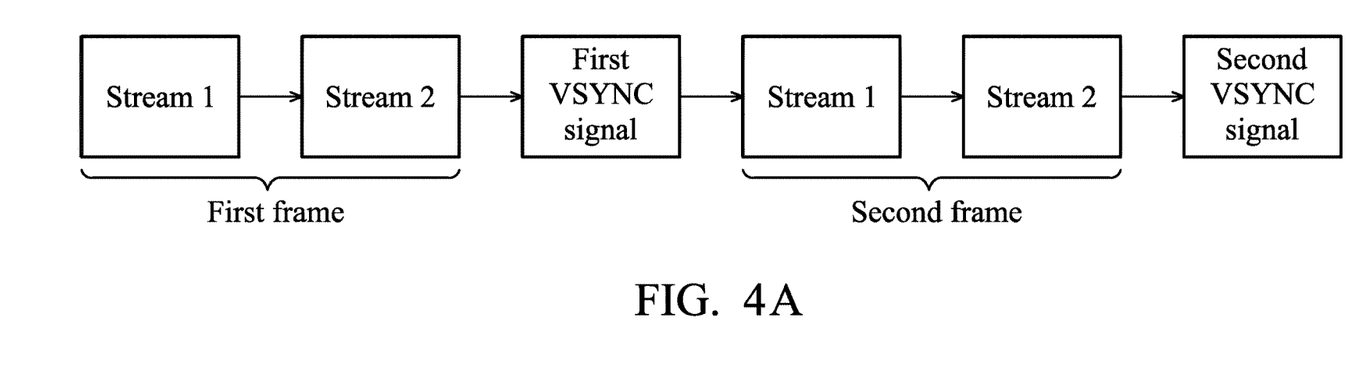
FIGS. 4A~4B show schematic diagrams of a conventional synchronous refresh mechanism of the prior art.
Figure 4B:
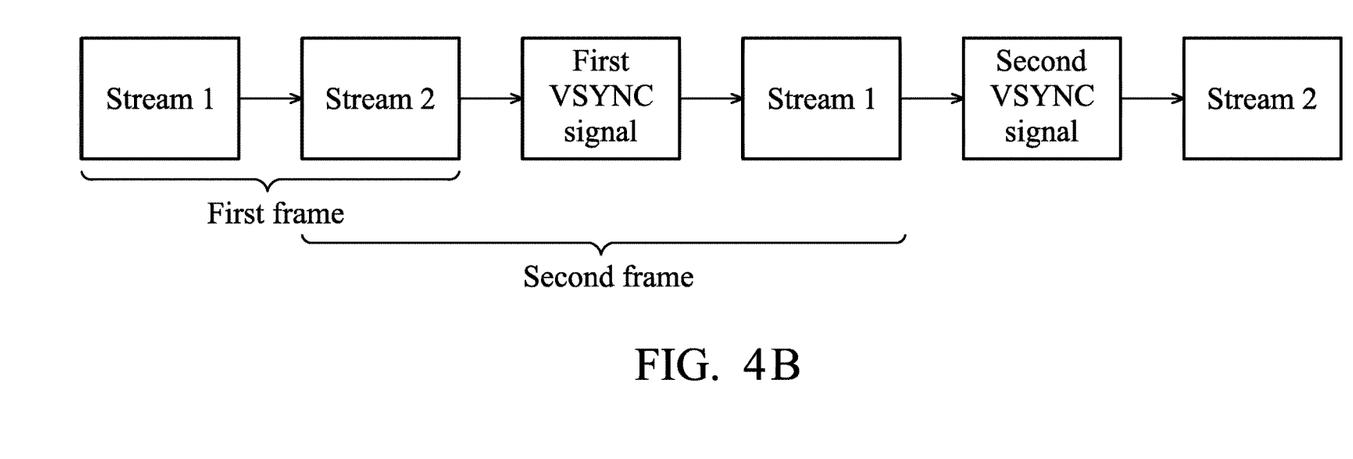

A conventional synchronous refresh mechanism is shown in FIGS. 4A~4B. In FIG. 4A, it is assumed that the DIU merely displays a stream 1 and a stream 2. Before receiving each VSYNC signal, the DIU is configured to synthesize the stream 1 and the stream 2 into a frame. After receiving the VSYNC signal, the DIU transmits the frame to the display device to display the frame. Therefore, the frame in FIG. 4A is correct.

However, in the time period between the VSYNC signals, due to the influence of the system performance and other factors, the DIU cannot update a frame completely. As shown in FIG. 4B, stream 1 and stream 2 are successfully updated before the first VSYNC signal is received, so that the DIU synthesizes the first frame correctly. Next, the DIU updates stream 1. However, before stream 2 is updated, the DIU has received the second VSYNC signal. The DIU will synthesize steam 2 of the first frame and the current stream 1 into the second frame, but the second frame is not the content displayed by the application.

In order to solve the problems shown above, the present invention provides a method and a device for processing graphics.

Figure 5:
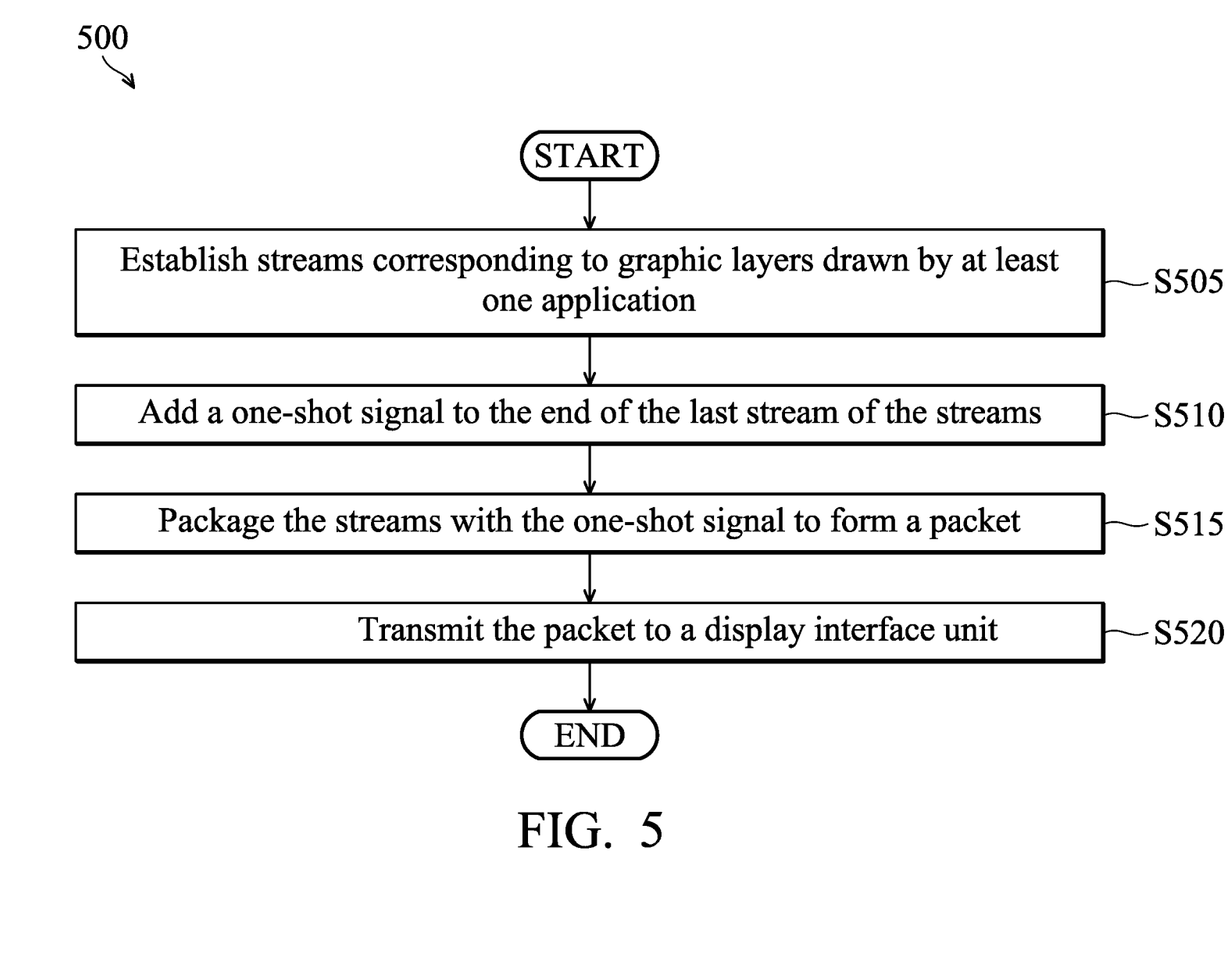
FIG. 5 is a flow chart illustrating a method for processing graphics according to an embodiment of the invention.

FIG. 5 is a flow chart 500 illustrating a method for processing graphics according to an embodiment of the invention. It should be noted that the method is performed by the HWcomposer 322 of the FIG. 3. In step S505, the HWcomposer establishes streams corresponding to graphic layers drawn by at least one application. Next, in step S510, the hardware composer adds a one-shot signal to the end of the last stream of the streams. In step S515, the hardware composer packages the streams with the one-shot signal to form a packet. In step S520, the hardware composer transmits the packet to a display interface unit (DIU).

Figure 6:
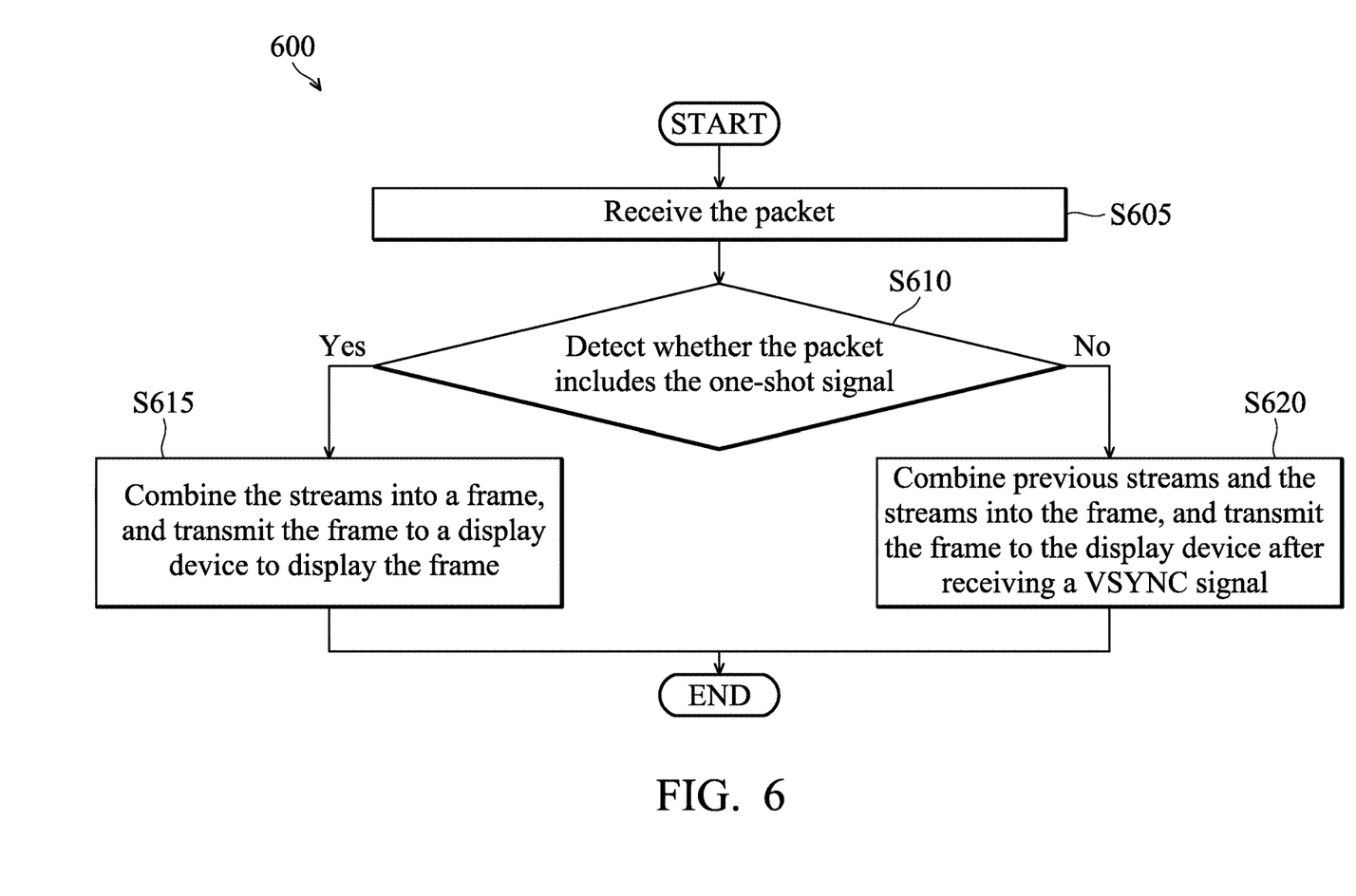
FIG. 6 is a flow chart illustrating a method for processing graphics according to an embodiment of the invention.

FIG. 6 is a flow chart 600 illustrating a method for processing graphics according to an embodiment of the invention. It should be noted that the method is performed by the display interface unit (DIU) 340 of the FIG. 3. In step S605, the DIU receives the packet. In step S610, the DIU detects whether the packet includes the one-shot signal. When the DIU detects that the packet includes the one-shot signal ("Yes" in step S610), in step S615, the DIU combines the streams into a frame, and transmits the frame to a display device to display the frame. When the DIU does not detect that the packet includes the one-shot signal ("No" in step S610), in step S620, the DIU combines previous streams and the streams into the frame, and transmits the frame to the display device after receiving a vertical synchronization (VSYNC) signal.

Figure 7:
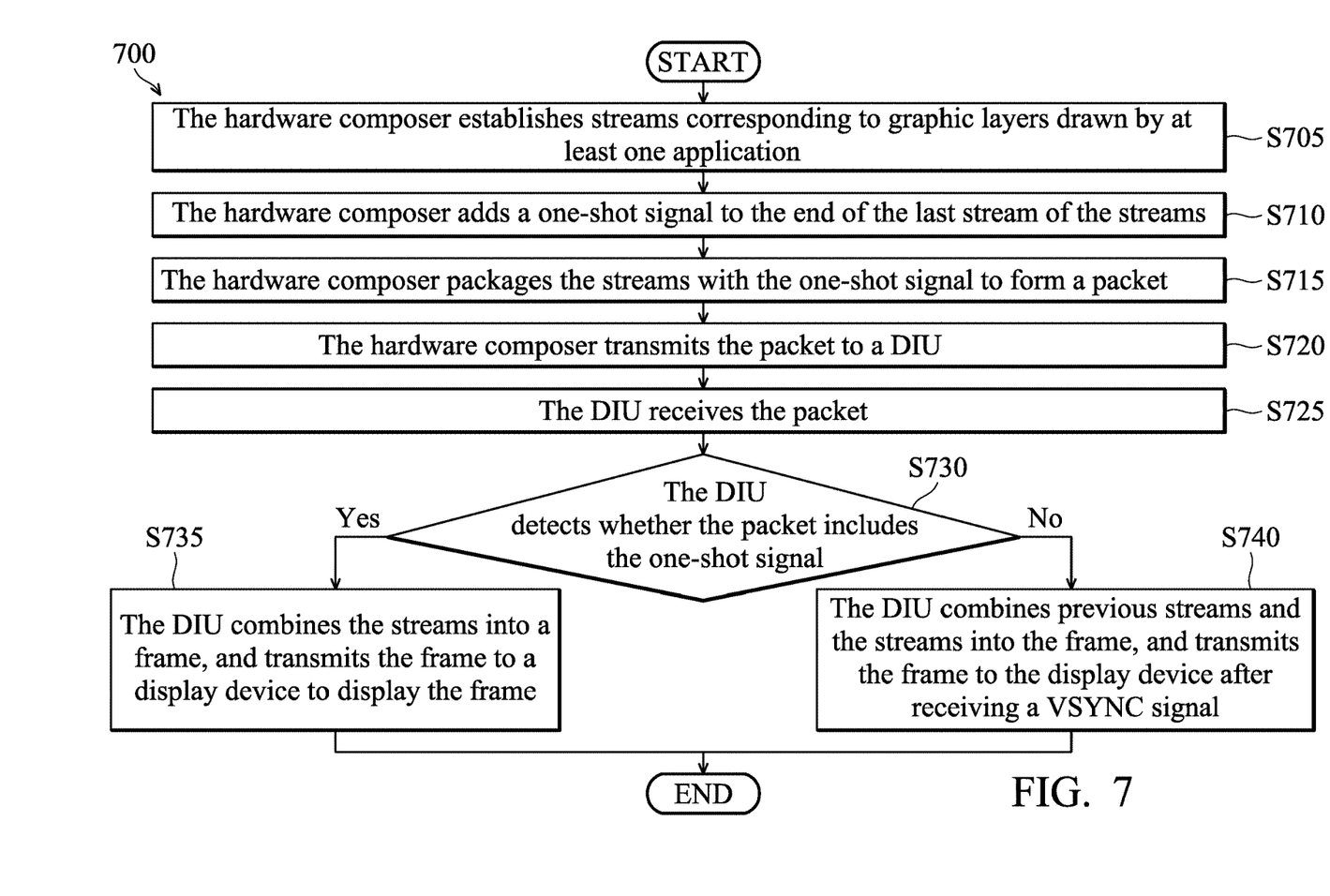
FIG. 7 is a flow chart illustrating a method for processing graphics according to an embodiment of the invention.

FIG. 7 is a flow chart 700 illustrating a method for processing graphics according to an embodiment of the invention. It should be noted that the method is performed by the HWcomposer 322 and display interface unit (DIU) 340 of the FIG. 3. In step S705, the hardware composer establishes streams corresponding to graphic layers drawn by at least one application. In step S710, the hardware composer adds a one-shot signal to the end of the last stream of the streams. In step S715, the hardware composer packages the streams with the one-shot signal to form a packet. In step S720, the hardware composer transmits the packet to a display interface unit (DIU). In step S725, the DIU receives the packet. In step S730, the DIU detects whether the packet includes the one-shot signal. When the DIU detects that the packet includes the one-shot signal ("Yes" in step S730), in step S735, the DIU combines the streams into a frame, and transmits the frame to a display device to display the frame. When the DIU does not detect that the packet includes the one-shot signal ("No" in step S730), in step S740, the DIU combines previous streams and the streams into the frame, and transmits the frame to the display device after receiving a vertical synchronization (VSYNC) signal In addition, the central processing unit 108 can execute the program code 112 to perform all of the above-described actions and steps or others described herein.

Therefore, the method and device for processing graphics of the present invention use a hardware composer to package the streams to form a packet, wherein a one-shot signal is added to the end of the last stream of the streams. The DIU combines the streams into the frame and transmits the frame to the display device after detecting that the packet includes the one-shot signal. Since the one-shot signal is added in the last stream, the DIU combines the streams into the frame so that the display device can render the content of the current frame correctly when the last stream is configured.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for processing graphics, comprising:
establishing streams corresponding to graphic layers drawn by at least one application;
adding a one-shot signal to the end of the last stream of the streams;
packaging the streams with the one-shot signal to form a packet; and
transmitting the packet to a display interface unit (DIU).

2. A device for processing graphics, comprising:
a control circuit;
a processor installed in the control circuit; and
a memory installed in the control circuit and operatively coupled to the processor;
wherein the processor is configured to execute a program code stored in the memory to instruct a hardware composer to:
establish streams corresponding to graphic layers drawn by at least one application;
add a one-shot signal to an end of a last stream of the streams;
package the streams with the one-shot signal to form a packet; and
transmit the packet to a display interface unit (DIU).

3. A method for processing graphics, comprising:
receiving a packet;
detecting whether the packet includes a one-shot signal;
combining streams corresponding to graphic layers drawn by at least one application into a frame after detecting that the packet includes the one-shot signal; and
transmitting the frame to a display device to display the frame.

4. The method for processing graphics as claimed in claim 3, further comprising:
combining previous streams and the streams into the frame, and transmitting the frame to the display device after detecting that the packet does not include the one-shot signal and receiving a vertical synchronization (VSYNC) signal.

5. A device for processing graphics, comprising:
a control circuit;
a processor installed in the control circuit; and
a memory installed in the control circuit and operatively coupled to the processor;
wherein the processor is configured to execute a program code stored in the memory to instruct a display interface unit (DIU) to:
receive a packet;
detect whether the packet includes a one-shot signal;
combine streams corresponding to graphic layers drawn by at least one application into a frame after detecting that the packet includes the one-shot signal; and
transmit the frame to a display device to display the frame.

6. The device for processing graphics as claimed in claim 5, wherein the processor further executes the program code to instruct the DIU to:
combine previous streams and the streams into the frame, and transmit the frame to the display device after detecting that the packet does not include the one-shot signal and receiving a vertical synchronization (VSYNC) signal.

7. A method for processing graphics, comprising:
establishing, by a hardware composer, streams corresponding to graphic layers drawn by at least one application;
adding, by the hardware composer, a one-shot signal to an end of a last stream of the streams;
packaging, by the hardware composer, the streams with the one-shot signal to form a packet;
transmitting, by the hardware composer, the packet to a display interface unit (DIU);
receiving, by the DIU, the packet;
detecting, by the DIU, whether the packet includes the one-shot signal;
combining, by the DIU, the streams into a frame after detecting that the packet includes the one-shot signal; and
transmitting, by the DIU, the frame to a display device for displaying the frame.

8. The method for processing graphics as claimed in claim 4, the method further comprising:
combining, by the DIU, previous streams and the streams into the frame, and transmitting the frame to the display device after detecting that the packet does not include the one-shot signal and receiving a vertical synchronization (VSYNC) signal.

9. A device for processing graphics, comprising:
a control circuit;
a processor installed in the control circuit; and
a memory installed in the control circuit and operatively coupled to the processor;
wherein the processor is configured to execute a program code stored in the memory to instruct a hardware composer and a display interface unit (DIU) to:
establish, by a hardware composer, streams corresponding to graphic layers drawn by at least one application;
add, by the hardware composer, a one-shot signal to the end of the last stream of the streams;
package, by the hardware composer, the streams with the one-shot signal to form a packet;
transmit, by the hardware composer, the packet to a display interface unit (DIU);
receive, by the DIU, the packet;
detect, by the DIU, whether the packet includes the one-shot signal;
combine, by the DIU, the streams into a frame after detecting that the packet includes the one-shot signal; and
transmit, by the DIU, the frame to a display device to display the frame.

10. The device for processing graphics as claimed in claim 9, wherein the processor further executes the program code to instruct the DIU to:
  combine previous streams and the streams into the frame, and transmit the frame to the display device after detecting that the packet does not include the one-shot signal and receiving a vertical synchronization (VSYNC) signal.

* * * * *